DAVID E. ROE.

Broiler.

No. 4,652. Reissued Nov. 28, 1871.

Witnesses.

Chas. H. Rowland

E. S. Pliers

Inventor

David E. Roe

AM. PHOTO-LITHOGRAPHIC CO. N.Y. (OSBORNE'S PROCESS.)

UNITED STATES PATENT OFFICE.

DAVID E. ROE, OF ELMIRA, NEW YORK.

IMPROVEMENT IN BROILERS.

Specification forming part of Letters Patent No. 106,210, dated August 9, 1870; reissue No. 4,652, dated November 28, 1871.

DIVISION B.

*To all whom it may concern:*

Be it known that I, DAVID E. ROE, of Elmira, in the county of Chemung and State of New York, have invented a new and useful Supporting Device for Broilers and for other purposes; and I do hereby declare the following to be a full, clear, and exact description of the same, reference being had to the accompanying drawing which forms a part of this specification, and in which—

Figure 1:
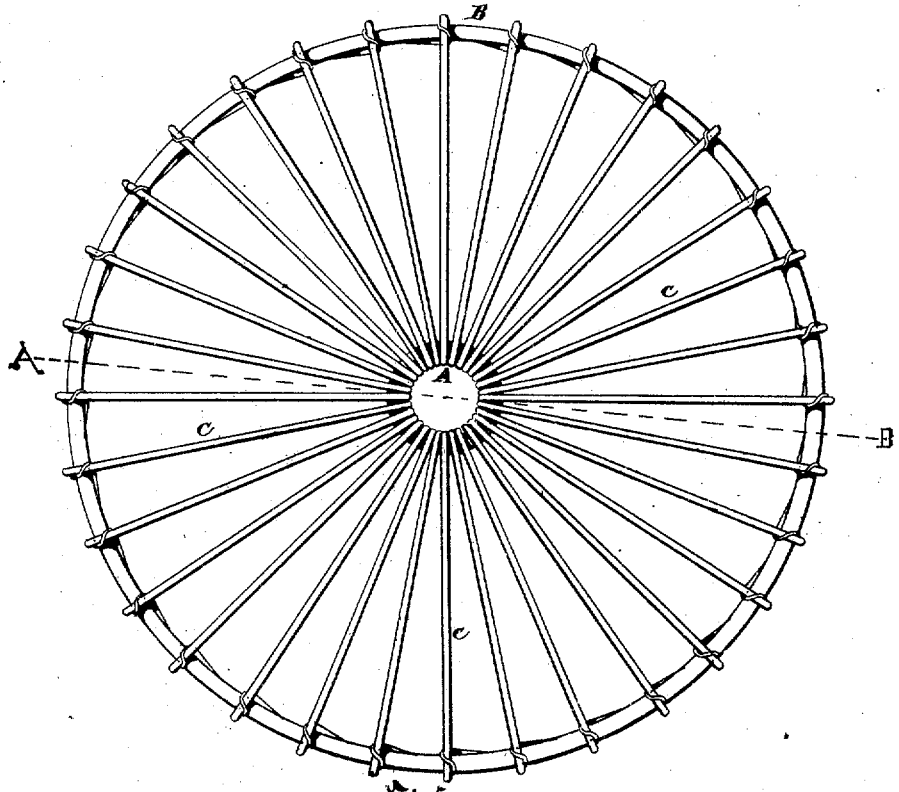
Figure 2:
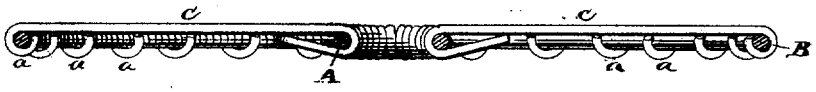

Figure 1 represents a plan view of my improved supporting device, and Fig. 2 represents a central vertical section at line A B, Fig. 1.

The nature of my invention consists in an improved supporting device for broilers and for other purposes, constructed substantially as hereinafter described.

In the drawing, A indicates a central ring, and B an outer ring, which rings are connected together by radiating arms or bars C, the radiating arms or bars C being so made that they can be hooked or clinched over the outer and inner rings, substantially as shown in the drawing.

The outer ends of the radial arms C, which are bent down and passed under the outer ring B, form supporting-feet *a* for the device, while the radial arms themselves serve to support the meat to be broiled, or any other article which may be placed upon them.

When the device is to be used in any position where there is a high degree of heat the outer ends of the radial arms C may be secured in position upon the outer ring B by means of small whipping-wire, as fully shown in Fig. 1 of the drawing; or when it is to be used in position where there is but little heat the arms may be secured by solder, or by turning the wires after they are put together.

Having described my improved supporting device, what I claim therein as new and of my invention, and desire to secure by Letters Patent, is—

1. The combination, with an inner and outer ring, of radiating arms, which hold the two rings together by being hooked or clinched upon them, substantially as described.

2. The combination, with the outer hooked ends *a*, of the arms when radiating from a common center of the outer ring B, substantially as described.

3. A supporting device for broilers and for other purposes, the parts of which are combined together, substantially as shown and described.

DAVID E. ROE.

Witnesses:

CHAS. H. ROWLAND,

E. S. GLENN.

(154)